Nov. 3, 1959　　　E. E. KIMBERLY　　　2,910,999
GAS-OPERATED LIQUID LEVEL SENSOR
Filed July 3, 1958
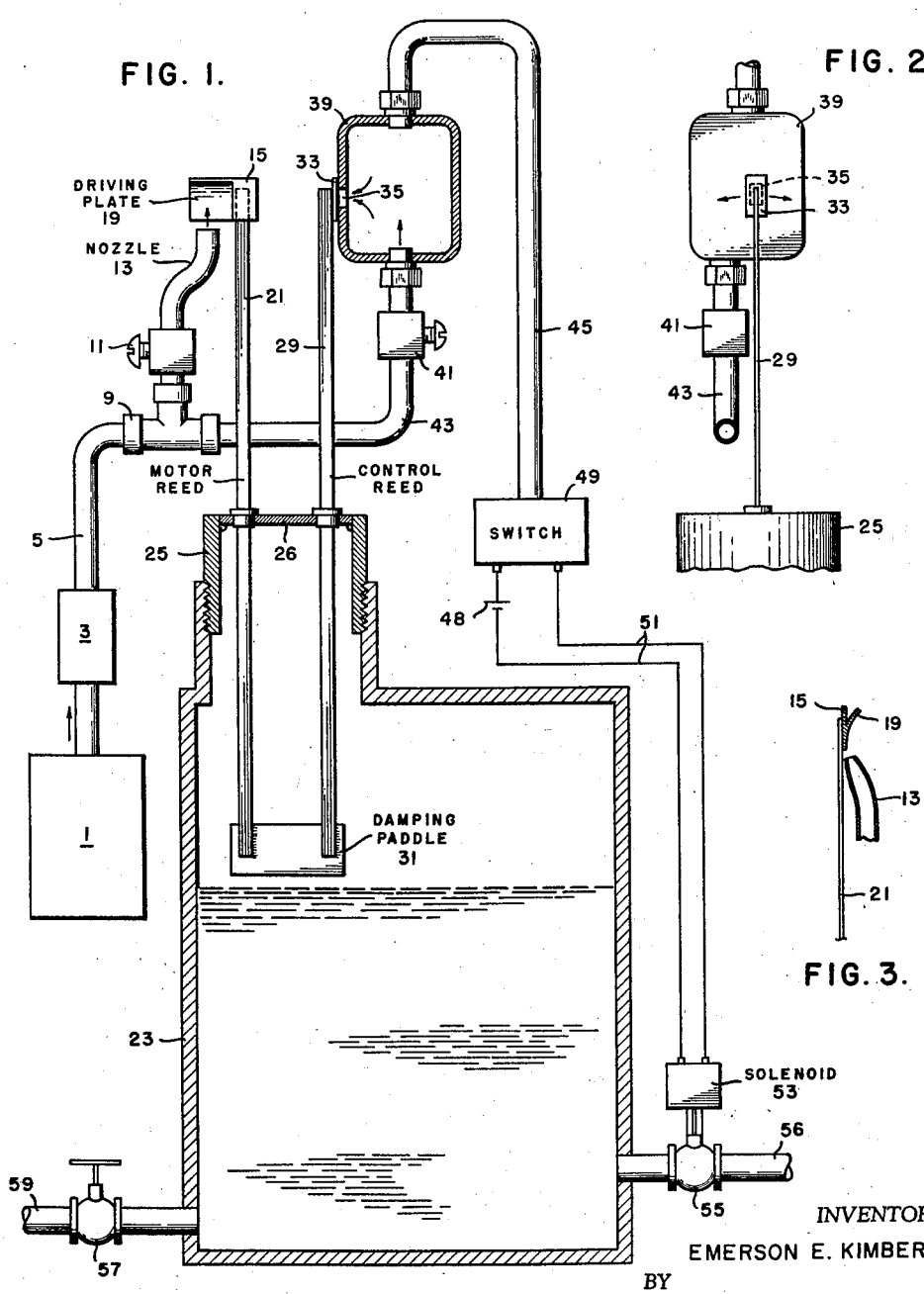
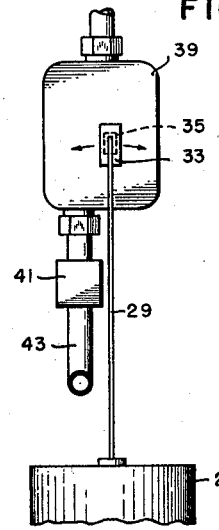
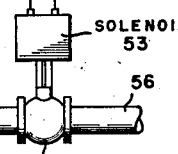
INVENTOR.
EMERSON E. KIMBERLY.
BY
ATTORNEY.

United States Patent Office 2,910,999
Patented Nov. 3, 1959

2,910,999

GAS-OPERATED LIQUID LEVEL SENSOR

Emerson E. Kimberly, Columbus, Ohio, assignor, by mesne assignments, to Jersey Production Research Company, Tulsa, Okla., a corporation of Delaware Application July 3, 1958, Serial No. 746,493

4 Claims. (Cl. 137—386)

This invention relates to apparatus for detecting and controlling liquid level. More particularly, the invention relates to liquid level controlling apparatus adapted for use in locations where there is no readily available source of electrical energy, or where the local supply of electrical energy is capable of supplying only a limited amount of power.

In many oil field locations there is a requirement for controlling the level of liquid in a liquid reservoir. For example, petroleum from a flowing oil well or from a well on pump may be stored in a local tank prior to delivery to a pipeline gathering system. Oil well locations are often located in remote areas away from power lines or other sources of relatively unlimited electrical power. In such locations, conventional electrical fluid level detecting devices are unsuitable. However, there is ordinarily associated even with remotely located oil wells a relatively reliable supply of pressurized gas.

In accordance with one aspect of the present invention, there is provided pressure responsive gating means for controlling fluid flow into or from a liquid reservoir. Coupled to the gating means for actuation thereof is the local source of pressurized gas. The coupling means for coupling the local source of pressurized gas to the gating means is provided with a port; the port when opened reduces the pressure on the coupling means below the pressure required for actuation of the gating means. Vibratory means, such as a reed system, is positioned in said reservoir so as to be exposed to the liquid to be detected. The vibratory means is supported so as to permit substantially free vibration thereof. The pressurized gas is directed against the vibratory means so as to impart thereto a substantially continuous vibrational stimulus of substantially constant amplitude. The vibrational element will vibrate substantially continuously at one amplitude when immersed in liquid in the reservoir, and at a materially higher amplitude when the level of the liquid in the reservoir is below and out of contact with the vibratory means. The vibratory means is further positioned so as to substantially close the port in the coupling means when immersed in the liquid in the reservoir. Closure of the port by the vibratory means will actuate the gating means. When the liquid in the reservoir is out of contact with the vibratory means, the substantially higher amplitude of vibration of the vibratory means will be sufficient to reduce the pressure on the gating means below the pressure required for actuation thereof.

The invention will be further described with reference to the accompanying drawing, wherein:

Fig. 1 is a schematic representation of an embodiment of the invention;

Fig. 2 is a side view of a portion of the apparatus of Fig. 1; and

Fig. 3 is a fragmentary view of the vibratory drive apparatus of Fig. 1.

With reference now to the drawing, there is shown a liquid reservoir 23 having an inlet line 56 and an outlet line 59. The inlet line is provided with a fluid pressure actuated gating means including a solenoid-actuated valve 55, a solenoid 53 for actuating the valve, and a pressure sensitive switch 49 coupling a battery 48 to the solenoid 53 by electrical leads 51 for energizing solenoid 53. The outlet line 59 may be provided with a conventional manually-actuated valve 57. Switch 49 is actuated by gas pressure which may be obtained from a local source of gas pressure 1, such as a gas well. Gas pressure source 1 may be coupled to switch 49 through a pressure reducing means 3, line 5, a T-coupler 9, line 43, a manually-actuated throttle 41, a pressure chamber 39, and line 45, all serially connected in the order named.

A recess is provided at the top of reservoir 23, to which is connected a control reed support cap 25. Cap 25 includes a pressure barrier 26, on which is supported a pair of vibratory reeds 21 and 29. Henceforth, reed 21 will be termed the motor reed, and reed 29 will be termed the control reed. The two reeds may be flexible metal strips adapted to vibrate at a natural frequency when a vibrational stimulus is imparted thereto. The reeds are supported by pressure barrier 26 at node points thereof so that the pressure barrier will not interfere with the vibration of the reeds. The reeds are connected together at the bottom ends thereof by a damping paddle 31. The damping paddle is positioned within reservoir 23 at the level at which it is desired to control the fluid level within the reservoir.

For the purpose of imparting vibrational stimulus to motor reed 21, and through damping paddle 31 to control reed 29, a driving plate 19 is connected to motor reed 21 at the top end thereof. As seen most perspicuously in Fig. 3, the driving plate 19 has a slight curvature and is connected to or integral with back plate 15, which is affixed to motor reed 21. Energy for the vibrational stimulus is derived from gas line 5 through T-connector 9, throttle valve 11, and nozzle 13. Gas ejected from nozzle 13 is directed against driving plate 19. Under the force of the gas being ejected from nozzle 13, motor reed 21 initially will be driven backward. Because of the curvature of driving plate 19, a turbulence will be set up around driving plate 19 and back plate 15 that will cause motor reed 21 to vibrate back and forth at substantially its natural vibrational frequency. Motor reed 21 will drive control reed 29 at the same vibrational frequency.

A port 35 is provided in pressure chamber 39. When this port is closed, the gas pressure in line 45 will build up to a pressure sufficient to actuate switch 49. However, when port 35 is open, the gas pressure within line 45 will fall quickly to a pressure below the pressure required for actuation of switch 49.

A plate 33 is affixed to the top end of control reed 29. This plate, when control reed 29 is not vibrating or is vibrating with a very small amplitude, will substantially close port 35. However, when the vibrational amplitude of control reed 29 is sufficiently high, port 35 will be partly or wholly opened twice on every cycle of oscillation of reed 29.

The operation of the apparatus described above will be set forth assuming that valve 57 is closed and that solenoid 53 is in a position to open valve 55. Gas pressure from source 1 will impart vibrational stimulus to motor reed 21 and control reed 29 from driving plate 19. The vibrational stimulus will be of substantially constant amplitude, whereby the vibrational element will vibrate at a materially higher amplitude when the paddle 31 is out of the liquid than when it is immersed in the liquid. Port 35 will be opened twice on every cycle of oscillation of control reed 29 so that the pressure in line 45 is less than the pressure required for actuation of switch 49. As soon as the liquid in the reservoir 23 rises to the point where it immerses damping paddle 31, the reeds 21 and 29 will be damped so that they will either stop or vibrate at a very low amplitude so as to substantially close port 35. Pressure in chamber 39 will build up rapidly to actuate switch 49. Solenoid 53 will be actuated to close valve 55 and stop the flow of liquid into reservoir 23.

The above description was made assuming that valve 55 is normally open when solenoid 53 is unenergized. Manifestly, this may not necessarily be the case, it being only necessary that switch 49 be open when actuated rather than closed, as assumed in the above description. Furthermore, if the pressure built up in line 45 is sufficient to actuate control valve 55 directly, switch 49, electrical lead 51, the source of electrical energy 48 associated therewith, and solenoid 53 may be eliminated. Line 45 will be connected directly to valve 55 and will actuate the valve when sufficient pressure is built up within chamber 39.

As set forth above, the vibrational elements or reeds 21 and 29 will vibrate substantially continuously at one amplitude when immersed in liquid in the reservoir and when vibrational stimulus of substantially constant amplitude is imparted thereto. In this connection, the phrase "vibrating substantially continuously at one amplitude" is to be construed to mean at zero amplitude as well as the low amplitude sufficient to substantially close port 35.

It is to be noted that the pressure in line 45 may control a valve in outlet line 59 rather than in inlet line 56. The valve would be opened when the liquid level damped the oscillation of paddle 31, and would be closed when liquid level was below paddle 31.

While one embodiment of the invention has been described above, it is to be understood that various modifications may be made without departing from the spirit and scope of the invention.

What is claimed is:

1. A liquid level sensor for use with a fluid pressure operated gating means for controlling liquid level in a liquid reservoir, comprising: paddle means; first and second elongated vibratory members connected together at one end thereof by said paddle means; said paddle means being positioned in said reservoir at a predetermined level of liquid to be detected therein; a source of pressurized gas; a driving plate connected to said first vibratory member in the vicinity of the end thereof opposite said paddle means; nozzle means coupled to said source of pressurized gas for directing gas against said driving plate to impart vibrational stimulus to said first vibratory member and through said paddle means to said second vibratory member; coupling means coupling said source of pressurized fluid to said gating means; port means in said coupling means for reducing the pressure on said gating means below a predetermined pressure required to actuate said gating means, said port being normally closed by said second vibratory member when said second vibratory member is not vibrating substantially and intermittently open when said second vibratory member is vibrating, the amplitude of vibration of said second vibratory member being reduced when said paddle is immersed in liquid to increase fluid pressure on said gating means to at least said predetermined pressure.

2. A liquid level sensor for use with a fluid pressure operated gating means for controlling liquid level in a liquid reservoir, comprising: first and second elongated vibratory members coupled together so as to vibrate substantially in unison; said vibratory members being directly exposed to liquid in said reservoir when the liquid is at a predetermned level in said reservoir; a source of pressurized gas; means coupled to said source of gas for directing gas against said first vibratory member to impart substantially continuous vibrational stimulus of substantially constant magnitude to said first vibratory member, whereby said first and second vibratory members will vibrate at one amplitude when immersed in liquid in said container, and at a substantially higher amplitude when the liquid in said reservoir is below and out of contact with said first and second vibratory members; coupling means for coupling said source of fluid pressure to actuate said gating means; port means in said coupling means for reducing the pressure on said gating means below a predetermined pressure required for actuation thereof, said port means being intermittently opened by said second vibratory member to reduce said pressure below said predetermined pressure when said second vibratory member is vibrating at said substantially higher amplitude and to increase said pressure above said predetermined pressure when said second vibratory member is vibrating at said one amplitude.

3. A liquid level sensor to control flow of liquid into a liquid reservoir through a fluid pressure operated gating means, comprising: elongated vibratory means; said vibratory means being directly exposed to liquid in said reservoir when the liquid is at a predetermined level in said reservoir; a source of fluid pressure; means coupled to said source of fluid pressure for directing fluid against said vibratory means to impart substantially continuous vibrational stimulus of substantially constant magnitude to said vibratory means, whereby said vibratory means will vibrate at one amplitude when immersed in liquid in said container, and at a substantially higher amplitude when the liquid in said reservoir is below and out of contact with said vibratory means; coupling means for coupling said source of fluid pressure to said gating means to actuate said gating means; port means in said coupling means for reducing the pressure on said gating means below a predetermined pressure required for actuation thereof, said vibratory means being positioned relative to said port means to intermittently open said port means to reduce the pressure in said coupling means below said predetermined pressure when said vibratory means is vibrating at said substantially higher amplitude and to increase the pressure in said coupling means above said predetermined pressure when said vibratory means is vibrating at said one amplitude.

4. In combination: a source of pressurized fluid; a reservoir for liquid; a normally closed pressure actuated gating means for admitting liquid into said reservoir when a pressure of predetermined magnitude is exerted thereon; coupling means including a line chamber for coupling said source of pressurized fluid to said pressure actuated gating means for actuation of said gating means; a port in said chamber for reducing the pressure on said gating means below said predetermined pressure; vibratory means for normally closing said port means, and extending into said reservoir to a level at which it will be exposed to liquid therein; means for directing fluid from said source of pressurized fluid against said vibratory means to impart substantially constant vibrational stimulus to said vibratory means whereby said vibratory means will vibrate at one amplitude when immersed in said liquid and at a substantially higher amplitude when the liquid in said reservoir is below and out of contact with said vibratory means; said vibratory means being positioned relative to said port to substantially close said port when vibrating at said one amplitude, and to substantially open said port when vibrating at said substantially higher amplitude to reduce the pressure on said gating means below said predetermined pressure.

References Cited in the file of this patent
UNITED STATES PATENTS

| | | |
|---|---|---|
| 1,956,920 | Haltmeier | May 1, 1934 |
| 2,111,036 | Wippel | Mar. 15, 1938 |
| 2,803,258 | Dyson | Aug. 20, 1957 |
| 2,843,147 | Penther | July 15, 1958 |